Dec. 14, 1971  B. M. DRINKARD  3,626,666
METHOD AND APPARATUS FOR FRACTIONAL SEPARATION OF MIXTURES
Filed May 18, 1970  4 Sheets-Sheet 1
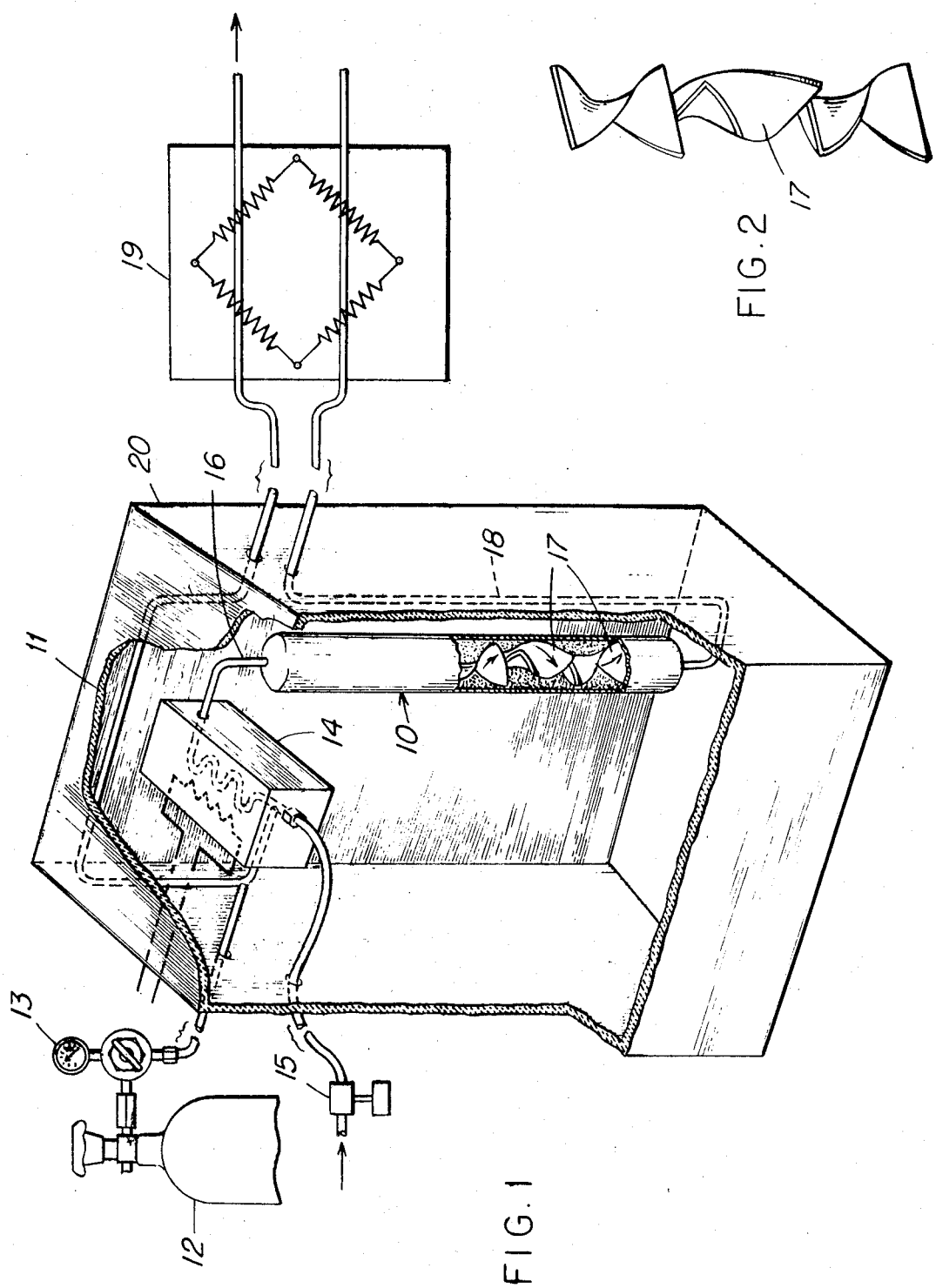

United States Patent Office 3,626,666
Patented Dec. 14, 1971

3,626,666
METHOD AND APPARATUS FOR FRACTIONAL SEPARATION OF MIXTURES
B. M. Drinkard, Beaumont, Tex., assignor to Mobil Oil Corporation
Filed May 18, 1970, Ser. No. 38,091
Int. Cl. B01d *15/08*
U.S. Cl. 55—67    9 Claims

ABSTRACT OF THE DISCLOSURE

This development provides a method and apparatus for improved fractional separation of mixtures, particularly hydrocarbons, by contacting the mixture in fluid form with a body of separatory material, such as a bed of solid adsorbent particles or solid particles impregnated with a liquid sorbent. The system is useful, for example in separation of organic compounds which have closely similar boiling points. The body of adsorbent is disposed along a compact path wherein are disposed diverting and dividing elements of such form and arrangement that a substantially constant cross section of the adsorbent bed is maintained along the path of contact.

BACKGROUND OF THE INVENTION

It has long been common practice to achieve separation of components of a fluid mixture by flowing the said fluid mixture in admixture with a carrier fluid along a path of a separatory material such that the components are separated by means of their varying rate of travel through the bed due to varying affinity of the separatory material for the different components of the mixture.

In adsorption chromatography, a gas sample is passed through a column containing an adsorbent in the form of granules which is used to separate the various constituents of the gas. The various components are separated by the process of selective adsorption and desorption so that the separated gas constituents issue from the exit of the column in sequential order related in some manner to their relative volatility, their molecular weight, or some similar property such as polarity, which affects the degree of their adsorption on the separatory material in the column.

In gas-liquid partition chromatography the essential feature is the provision in the chromatographic column for contacting of the gas mixture (carrier gas-sample mixture) with a liquid surface (liquid phase). The liquid surface may be in the form of a thin film over a large exposed surface of the inert support contained in the column. When the gas sample is passed through a column of this type, continuous solution and evaporation of sample components (solute) take place along the length of the column. This process effects varying rates of progress for sample components during passage through the column and results in components being sequentially eluted from the column in some manner corresponding to their relative selectivities for the liquid phase coating the exposed surface.

The prior art has recognized problems in separations of the type to which this invention relates. Also it has recognized the tendency of columns to lose their resolving power and separating ability as the diameter of the columns is increased. In addition, it is known that channeling through the mass of separatory materials can result in band broadening (loss of efficiency), that is, in blurring the sharpness of separation of each fraction as it progresses through the mass of separatory material.

Another effect which has been noted as a cause of that band broadening is due to wall effects in the vessel defining the separatory zone.

These adverse effects have been the subject of proposals on how to improve the efficiency of columns of the type with which this invention is concerned. In general, devices for this purpose have been in the nature of obstructions placed in the path of flow of the fluid mixture to be separated. A typical device of that type is described in U.S. Pat. No. 3,250,058 granted May 10, 1966, to R. F. Baddour.

The high pressure drops induced by devices such as those devised by Baddour and others, notably Crowley in U.S. Pat. No. 3,453,811, dated July 8, 1969, result in excessive costs of operation and other undesirable side effects.

BRIEF DESCRIPTION OF THE INVENTION

According to this invention, the path through the body of separatory material is characterized by elements so shaped and so arranged that the fluid flowing through the separatory space is subjected to helical motion which is repeatedly reversed at appropriate intervals along the path of flow. This is achieved by placing within the path a series of twisted elements such as those made of thin, flat sheet, generally having a width equal to the diameter of the separatory vessel defining the separatory zone and the length somewhat greater than the width. Each of such sections is twisted along the length such that two adjacent ends (i.e., the abutting upstream and the downstream edges of successive sections) are at a substantial angle to each other. Elements are thus characterized by the fact that each line across the width of the body (transverse to fluid flow) is a straight line, but the lines along the length are curved to helical form. Alternate deflecting elements of this type are formed so as to have a twist which is the reverse of preceding and succeeding elements. Successive elements are mounted so that the adjacent ends of any two elements are at an angle, preferably at a 90° angle to each other. Devices of this type are described in Armeniades Pat. 3,286,992, granted Nov. 22, 1966, wherein such an arrangement is shown to have a mixing effect.

According to my invention, it has now been established that these elements, which are highly efficient mixing devices, surprisingly have the effect of improving the efficiency of the present separatory operation.

DESCRIPTION OF THE INVENTION

The nature of the invention and the manner of performing the same are hereinafter more particularly described with reference to the annexed drawings, wherein:

FIG. 1 illustrates, partially in section, apparatus suitable for practice of the invention in which illustration some elements well known in the art are represented diagrammatically;

FIG. 2 is a detailed view of flow control elements characteristic of one embodiment of the invention;

Figure 3:
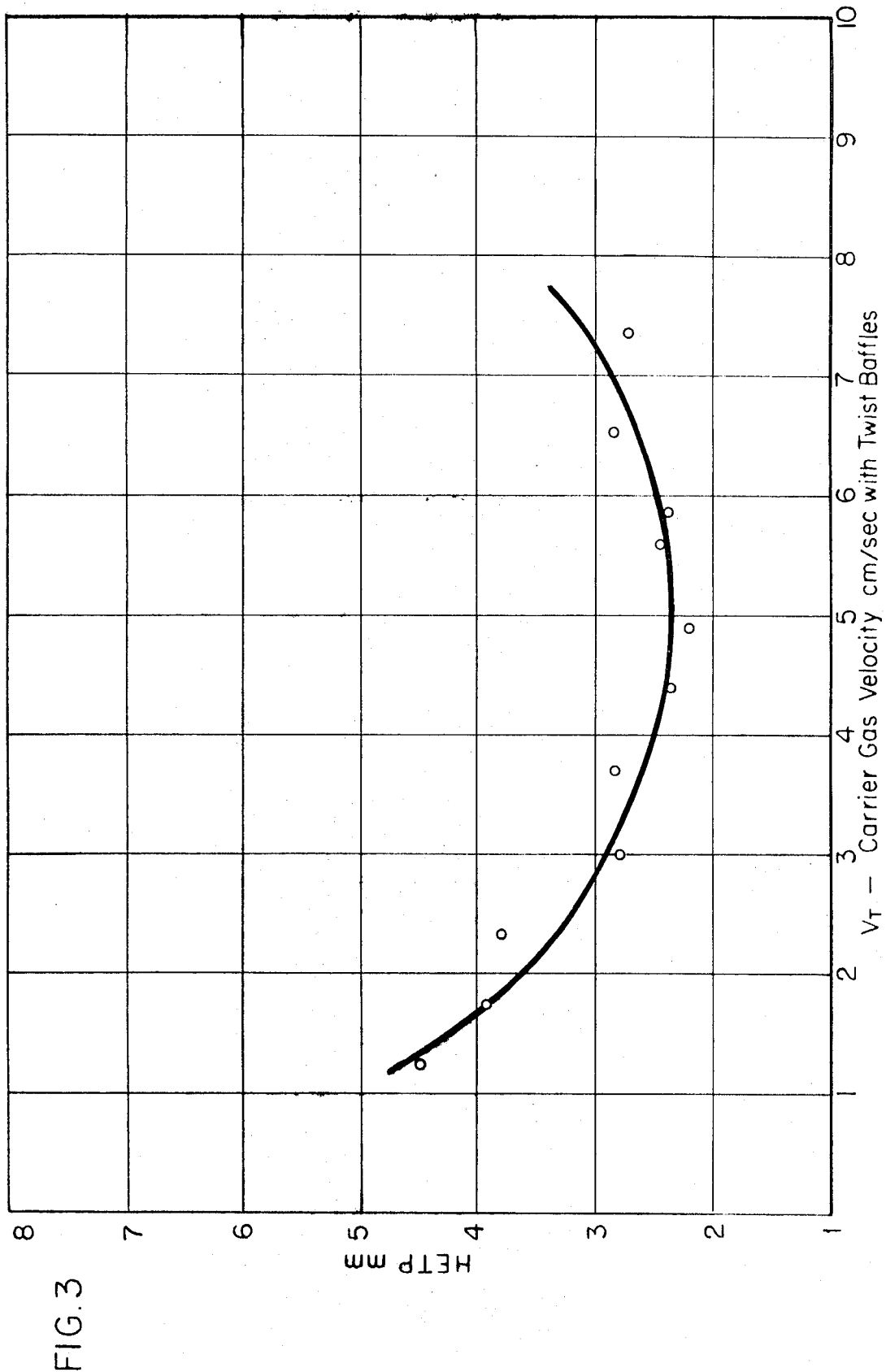
FIG. 3 is a graphical representation of the manner which height of one equivalent theoretical plate (HETP) varies with carrier gas velocity in a typical embodiment of the invention for a 1.75" x 3.50' column.
Figure 4:
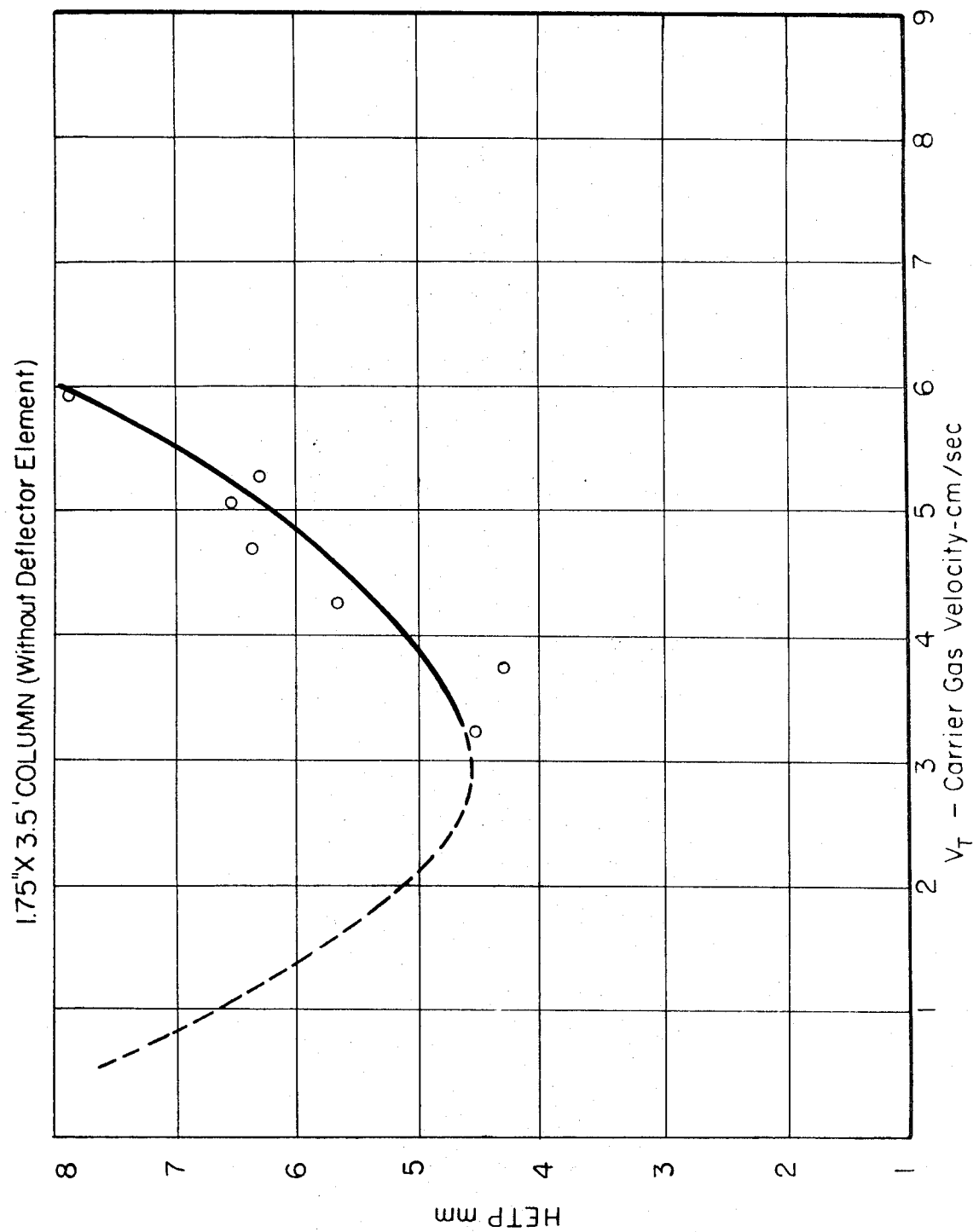
FIG. 4 is a similar graphical representation with respect to the 1.75" x 3.50' column packed with the same material as FIG. 3 above, however, the deflector elements were not employed. It is readily observable that the efficiency of the column without deflectors is only one-half that for a column with deflectors.
Figure 5:
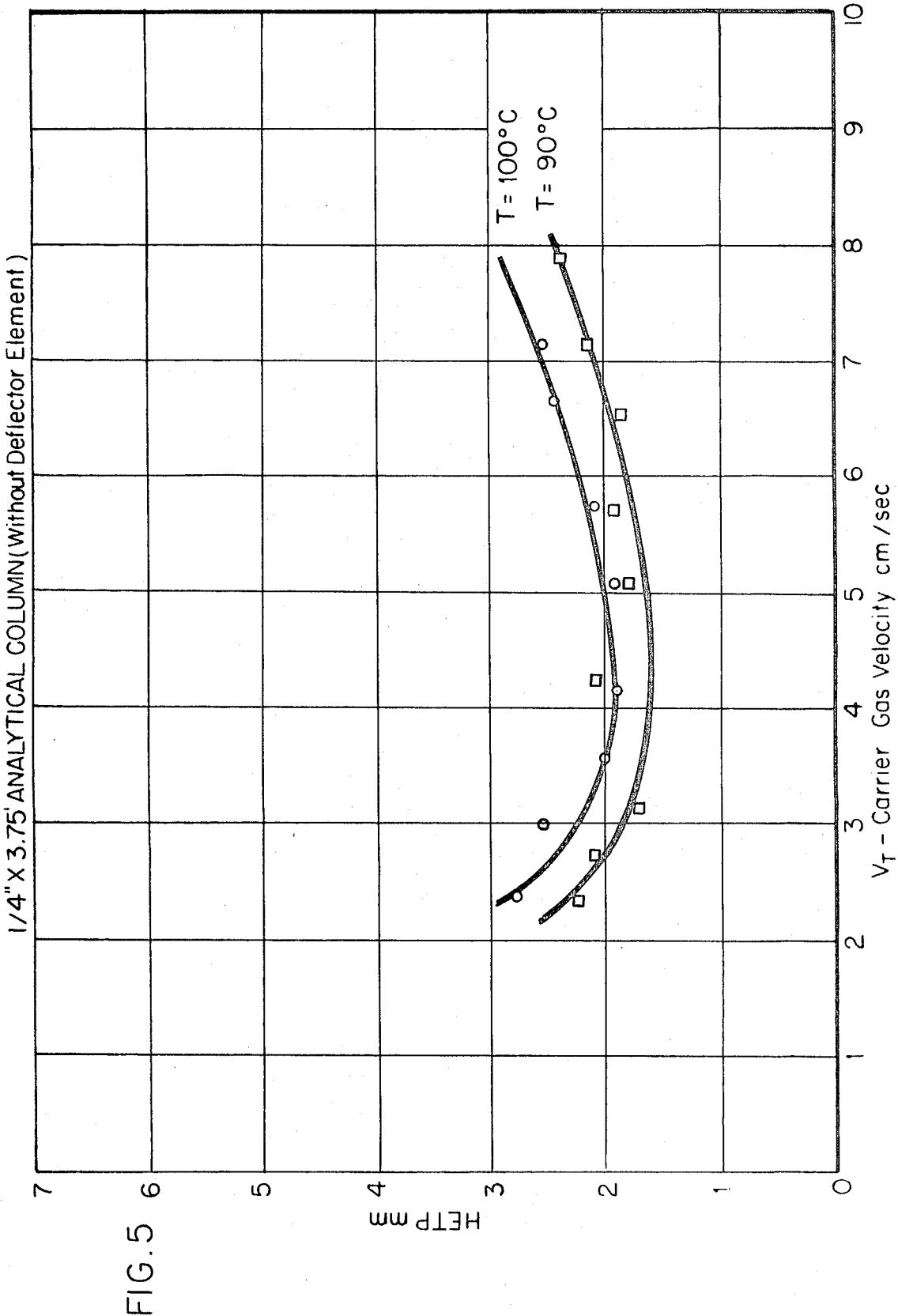
FIG. 5 is a similar graphical representation with respect to a conventional analytical (¼" outside diameter) column prepared from the same packing material as FIG. 3 above. A comparison of FIGS. 3 and 5 demonstrates that the efficiency of a large diameter column equipped with the deflector elements is equivalent to that for a ¼" column.

As will be seen from FIG. 1, apparatus for practice of the invention comprises a separatory column 10 within an oven of which only the walls 11, in section, are shown in the figure. The oven is equipped with the usual temperature control equipment, common in this art and not here specifically shown, for maintaining a desired constant temperature. A carrier gas passes continuously through the column 10 from any suitable source, shown here as a helium cylinder 12 through pressure regulator to a heated metal block 14 within the oven having a gas passage therethrough as indicated. A charge mixture for fractional separation is introduced in regulated amounts at predetermined intervals of time by one of numerous devices common in this art. For example, a convenient procedure is by use of a metering pump discharging to the gas passage in block 14 for admixture therein with the carrier gas.

The temperature adjusted carrier gas stream, bearing admixed portions of charge material at suitably spaced intervals, passes to the top of column 10 by line 16. The separatory column is fitted with a series of deflector elements 17, portions of two of which appear in the fragmentary section in FIG. 1. The deflector elements are shown in more detail in FIG. 2. Simply stated, the deflector elements are spirally curved surfaces extending across the diameter of the cylindrical column 10 in such manner as to divide the cross section thereof into the two equal portions. Due to the curvature of the deflector elements, the path along each side of any deflector 17 is generally helical in form. Adjacent ends of successive deflectors 17 are set at an angle, preferably a right angle, to each other and the direction of twist of successive deflectors 17 is opposed. It will be apparent that the stream flowing along each side of any deflector 17 will become divided upon reaching the end of the next deflector 17 with one half of each stream being combined with one half of the other stream and the resultant stream being deflected to helical flow in a direction opposite to that of both of the two portions combined to form each of the resultant streams.

The method of this invention contrasts strongly with the known deflectoring systems proposed for fractionation of mixtures wherein the flow through the separatory column is deliberately obstructed (as in Baddour, supra) to divert the flow from axial to transverse with resultant impedance to flow giving localized high pressure drop across the redistribution zone. This not only introduces an undesirably high pressure drop across the separator as a whole, but also causes a drastic variation in pressure drop per unit of length along the separator.

Since the system of this invention provides passages through the sepaartion zone of constant cross-section, pressure drop is minimal, being increased only to the extent of rotational acceleration of the gaseous mass undergoing separation.

The space in the column within the walls thereof, and not occupied by deflector elements 17, is packed uniformly with any suitable separatory material such as a selective porous adsorbent, a liquid separation agent on a suitable carrier or any of the other separatory agents well known to the art. Although the specific descriptions here relate to separation from gaseous mixtures, any fluid mixture can be subjected to fractional separation according to this invention by utilizing a separatory material packing adopted to the separation desired, as from any gaseous or liquid phase mixture.

During passage through the separatory column, the components of the charge mixture are delayed for different time periods, such that the effluent is stratified with a sharpness of definition depending upon efficiency of the column. This factor is commonly calculated as equivalent number of theoretical plates. The efficiencies of various systems can therefore be compared by heights of the columns required to achieve equivalent performance. Reduced to a unit of measurement, this becomes the height of the column required for equivalence to one theoretical plate, or height equivalent to a theoretical plate (HETP). That value for structures embodying the present invention will be derived hereinafter from experimental data.

The effluent of the column, stratified in the manner explained above, passes from the bottom of column 10 by line 18 to a thermal conductivity detector 19 in which it passes over one leg of a Wheatstone bridge. A flow of carrier gas passing through line 20 in the oven, and therefore at the same temperature as the column effluent, passes over an opposed leg of the bridge in thermal conductivity detector 19. While not essential to the operation and not shown in the drawing, a portion of the effluent from column 10 bearing a separated component of the charge mixture on reaching the detector 19, will unbalance the bridge thus activating controls to divert that portion of effluent to an appropriate collector by operation of valves in a manner usual in this art.

Although some advantage may be obtained by providing the deflector elements of this invention along only a portion of the column, it is preferred to provide such deflectors along the entire length of packing since their effect is to increase the efficiency of a unit length of column.

The character of the packing will vary with the separation which it is desired be achieved. In certain of the data given below, the packing is of solid material impregnated with a liquid having a selectively varying affinity for components of the charge mixture. Other separatory materials may be based on a more absolute selectivity. For example, the well know zeolite 5A is a porous crystalline material having uniform ports of such size that normal aliphatic hydrocarbons may pass through the ports to the inner sorption area, but branched chain aliphatics are excluded because their cross-section is greater than the diameter of the ports, generally regarded as about 5 A.

The column may be of any diameter suitable to accomplish the desired throughput. Its length will be such as to provide a number of theoretical plates adequate for separation of the components of the charge mixture. For large diameter columns, the charge may be added to the carrier gas and that admixture passed through suitable means to induce thorough mixing to achieve homogeneity of the whole before entering the separatory column. Strangely enough, the same type of deflectors as are used to improve sharpness separation in the packed column 10 may be employed in an unpacked conduit, with or without heat exchange, to adjust the temperature of the mixture and/or to induce thorough mixing. Such mixing of deflectors has been suggested heretofore. See, for example, Pattison, "Motionless Inline Mixers Stir Up Broad Interest," Chemical Engineering, May 19, 1969, pages 94–96.

Although shown here as embodied in a single, fixed bed separatory column and a gaseous charge, the invention is applicable to separation of liquid phase mixtures and to moving bed separatory systems. For example, a recently introduced separatory system known as "Molex" achieves the effect of moving beds by sequential change of the charge and discharge ports in a series of segregated beds. That system is shown and described in Netherlands patent application No. 6,704,110, open for inspection Sept. 23, 1968. It is noteworthy that, in the system there is no through flow of carrier gas as in the above specific description of the invention. Instead, the Molex system provides for flow of an auxiliary gas in rectifying zones. Because the effect of the deflectors here described is to increase efficiency by reducing the height of one theoretical plate (increasing the number of theoretical plates in any given length of column) the invention is adaptable in obvious manner to Molex systems.

As the deflectors described herein are such efficient mixing devices it is apparent that they will provide excellent mixing advantages other than in the process specifically described herein. Thus, they will prevent channelling in packed beds (chromatography columns, fixed bed reactors, adsorption beds, etc.). Consequently, another benefit derived from their use is greater utilization of material contained in the bed. This means greater throughput for commercial chromatography columns, improved efficiency for reactors and adsorption beds, and possibly elimination of criticality of length: diameter ratios for reactor design. Also the combination of mixing and heat transfer provided by these devices is effective in reducing the tenency for development of hot spots in catalyst beds during start-up and regeneration.

The invention is illustrated by the following working examples but it is not to be considered as limited thereto.

EXAMPLE I

As shown in FIG. 3, the HETP of the present system is somewhat sensitive to carrier gas velocity, permitting selection of conditions of operation to give optimal results based on both absolute efficiency and total throughput per unit of time. The points plotted are derived from an experiment in which ethyl benzene is separated from air. Due to nature of the separatory material, the valid assumption is made that air moves through the column at the same velocity as the carrier gas, while ethyl benzene moves more slowly.

The column employed in this example had an inside diameter of 1.75 inches and a length of 3.5 feet. It was fitted through its length with deflectors of the general shape shown in FIG. 2 formed by twisting stainless sheet of 1/8 inch thickness 180° along the length and stacked so that the adjacent ends of sequential deflectors were at an angle of essentially 90° to each other. The deflectors were of such size that they fit snugly in the column, but a seal was not formed between the element and column wall, that is, their width is almost equal to the inside diameter of the column. The length of each deflector in its twisted form is 3.5 inches. It is to be understood that the deflectors can be sealed to the column wall if such is desired and in some cases this may provide a more efficient operation.

The column thus fitted with deflectors was packed with the condensation product of pyromellitic anhydride with a mixture of $C_5$-$C_7$ trihydrofluoroalcohols (Dupont "Zonyl" E-7) on 60–80 mesh Chromosorb-P, a well known separator. The packing was 20 weight percent of Zonyl E-7. Ethyl benzene plus air was introduced to the temperature adjusting block 14 in each of several runs at 100° C. and varied velocities of helium as carrier gas. The data collected are presented in Table A below wherein:

Flow is measured rate of carrier gas introduction in liters/minute.

Air Peak Time in seconds between introduction of sample and detection of air peak maximum at detector 19.

TABLE A 1.75″ x 3.5′ 20% Zonyl E-7 on 60 to 80 mesh Chrom. P with Deflector Elements

| Run: | Carrier flow | Air peak | $V_t$ | R | W | N | HETP |
|---|---|---|---|---|---|---|---|
| 1 | 0.40 | 155 | 0.74 | 1,544 | 245 | 159 | 7.19 |
| 2 | 0.60 | 91 | 1.26 | 1,004 | 126 | 254 | 4.50 |
| 3 | 0.87 | 67 | 1.71 | 752 | 88 | 292 | 3.91 |
| 4 | 1.37 | 49 | 2.33 | 533 | 61 | 305 | 3.75 |
| 5 | 1.80 | 38 | 3.01 | 418 | 41.4 | 407 | 2.81 |
| 6 | 2.37 | 31 | 3.69 | 324 | 32.4 | 400 | 2.86 |
| 7 | 2.84 | 26 | 4.40 | 277 | 25.2 | 483 | 2.37 |
| 8 | 3.37 | 23.5 | 4.86 | 245 | 21.6 | 515 | 2.22 |
| 9 | 3.90 | 20.5 | 5.57 | 212 | 19.8 | 459 | 2.49 |
| 10 | 4.41 | 19.5 | 5.86 | 196 | 18.0 | 474 | 2.41 |
| 11 | 4.92 | 17.5 | 6.53 | 180 | 18.0 | 400 | 2.86 |
| 12 | 5.33 | 15.5 | 7.37 | 166 | 16.2 | 420 | 2.72 |

NOTE:
$V_t$ = Velocity through column determined by dividing length of the column in centimeters by the time in seconds for appearance of the air peak maximum at the detector.
R = Retention time of ethyl benzene maximum measured as elapsed seconds from detection of air peak to detection of the ethyl benzene at the detector;
W = Width of the ethyl benzene peak at one-half the peak height as measured at the detector;
N = Number of theoretical plates as calculated from the above data;
HETP = Calculated by the formula:

$$HETP = \frac{L}{4\left(\frac{R}{W}\right)^2}$$ where L is length of column in mm.

EXAMPLE II

Similar runs were made in the same column with the same packing, but without the twisted deflectors used in Example I:

From these examples, it will be seen that the deflectors gave a column having a minimum HETP of 2.22 mm., while a column without the deflectors had a minimum HETP of 4.42 mm. The results of these runs are given in Table B following.

TABLE B 1.75″ x 3.5′ 20% Zonyl E-7 on 60 to 80 Mesh Chrom. P (110° C.) without Deflector Elements

| Run: | Carrier flow | Air peak | $V_t$ | R | W | N | HETP |
|---|---|---|---|---|---|---|---|
| 1 | 2.10 | 34 | 3.26 | 232 | 29.7 | 244 | 4.54 |
| 2 | 2.45 | 30 | 3.70 | 202 | 25.5 | 251 | 4.42 |
| 3 | 2.85 | 26 | 4.27 | 178 | 25.5 | 195 | 5.69 |
| 4 | 3.20 | 24 | 4.63 | 164 | 24.8 | 174 | 6.37 |
| 5 | 3.55 | 22 | 5.04 | 153 | 23.4 | 201 | 5.52 |
| 6 | 3.75 | 21 | 5.28 | 162 | 24.1 | 175 | 6.34 |
| 7 | 5.30 | 19 | 5.84 | 128 | 22.7 | 140 | 7.92 |

EXAMPLE III

This example illustrates the separation of a mixture of $C_8$ aromatics by the chromatographic process. In this example the column is packed with a ZSM-5 zeolite.

The zeolite, ZSM-5, is disclosed and claimed in co-pending application Ser. No. 865,472, filed Oct. 10, 1969 and owned by the same assignee. In terms of mole ratios of oxides, ZSM-5 compositions are as follows:

$$0.9 \pm 0.2 \; M_{2/n}O : Al_2O_3 : 5\text{--}100 \; SiO_2 : zH_2O$$

wherein M is a cation, $n$ is the valence of said cation, W is selected from the group consisting of aluminum and gallium, Y is selected from the group consisting of silicon and germanium, and Z is from 0 to 40. In a preferred synthesized form, the zeolite has a formula, in terms of mole ratios of oxides, as follows:

$$0.9 \pm 0.2 \; M_{2/n}O : Al_2O_3 : 5\text{--}100 \; SiO_2 : zH_2O$$

and M is selected from the group consisting of a mixture of alkali metal cations, especially sodium, and tetraalkylammonium cations, the alkyl groups of which preferably contain 2–5 carbon atoms. Preferably, W is aluminum, Y is silicon and the silica/alumina ratio is 10 to 60.

Zeolite ZSM-5 can be suitably prepared by preparing a solution containing tetrapropyl ammonium hydroxide, sodium oxide, an oxide of aluminum or gallium, an oxide of silica or germanium, and water and having a composion, in terms of mole ratios of oxides, falling within the following ranges:

TABLE C

|  | Broad | Preferred | Particularly preferred |
|---|---|---|---|
| OH−/SiO | 0.07–1.0 | 0.1–0.8 | 0.2–0.75 |
| $R_4N^+/(R_4N^++Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum or gallium and Y is silicon or germanium, maintaining the mixture until crystals of the zeolite are formed. Thereafter, the crystals are separated from the liquid and recovered. Typical reaction conditions consist of heating the foregoing reaction mixture to a temperature of from about 150° C. to 175° C. for a period of time of from about six hours to 60 days. A more preferred temperature range is from about 160 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for about 8 to 24 hours. Of course, milder conditions may be employed if desired, e.g., room temperature under vacuum.

A column of the type and size described in Example I is fitted through its length with deflectors of the general shape shown in FIG. 2, also as described in Example I. The column thus fitted with deflectors is packed with ZSM–5 zeolite prepared as described hereinbefore and maintained at a temperature of 180° C. Thereafter 60.0 grams of a solution containing 24 wt. percent p-xylene, 59 wt. percent m-xylene and 17 wt. percent o-xylene is pumped to the top of the column at a pumping speed of 20 ml./hr. A helium flow at a rate of 25 ml./hr. is maintained through the column. Fractions are eluted from the column using a helium flow and water as a stripping agent. The eluted fractions are trapped and isolated in cooled (−196° C.) glass traps. After contact for three hours, the solution is filtered and the unabsorbed fraction is analyzed. The filter cake containing the sorbed fraction is then washed with 100 grams mesitylene followed by extraction for 20 hours with 1.5 liters of normal hexane at 50° C. The xylene is recovered by distillation and paraxylene is obtained having a purity greater than 99%.

The following is a detailed analysis of the run:

| | |
|---|---|
| Sorbent type | ZSM–5 |
| Solution composition (wt. percent): | |
|   p-Xylene | 24 |
|   m-Xylene | 59 |
|   o-Xylene | 17 |
| Contact time (hrs.) | 3 |
| Temperature (° C.) | 180 |
| Unadsorbed fraction: | |
|   Wt. of filtrate (g.) | 68 |
|   Composition (wt. percent): | |
|     p-Xylene | 17 |
|     m-Xylene | 65 |
|     o-Xylene | 18 |
| Sorbed fraction: | |
|   Wt. of filter cake (g.) | 74 |
|   Wash | [1] 100 |
|   Extraction procedure | [2] 20 |
|   Wt. of extract (g.) | 230 |
|   Composition (wt. percent): | |
|     Normal hexane | 95 |
|     Xylene isomers | 1 |
|     Mesitylene | 4 |
| Wt. of xylene fraction (g.) | 1.8 |
| Composition (wt. percent): | |
|   p-Xylene | >99 |
|   m-Xylene | |
|   o-Xylene | |
| Gram of p-xylene recovered/100 g. solid | 3.6 |

[1] G. of mesitylene.
[2] Hrs. Soxhlet extraction (1.5 liters of $nC_6H_{14}$ at 50° C.).

The p-xylene recovered from the process is of sufficient purity to be used in the well known manufacture of terephthalic acid which is an intermediate in the manufacture of synthetic fibers such as "Dacron."

The invention has been illustrated with reference to use of the apparatus in certain specific chromatographic separation processes. However, as is obvious, the novel apparatus will provide the same advantages in any other type of chromatographic separation process.

I claim:

1. An improved method for fractional separation from a fluid mixture of at least one fraction relatively rich in a desired component by passage of the mixture through a mass of separatory material characterized by the property of retaining at least one component of said mixture to a different extent than retention of at least one other such component, which comprises introducing such fluid mixture to one end of said mass for longitudinal flow therethrough;

throughout a deflection zone constituting a substantial portion of the length of said longitudinal flow, subjecting the fluid flowing therein to deflection in helical paths;

periodically reversing the rotational direction of the helical paths;

each of the paths between points of reversal being characterized in that the streams in such period are isolated from each other;

dividing each of the streams at a point of reversal into two parts;

combining one part from each stream with one part from the other stream to form two streams each of which is a blend from both streams of the preceding period;

whereby the fluid is subjected to helical flow of repeated reversed direction and repeated splitting and recombination through the deflection zone without incurring any substantial change in the cross-sectional area of effective separatory material in said deflection zone; and withdrawing the separated components of said fluid from the mass of separatory material.

2. A method according to claim 1 wherein the separatory material is one of a selective porous solid adsorbent and a liquid separation agent on a carrier.

3. A method according to claim 2 wherein a carrier gas is admixed with the mixture in passage through the separatory material.

4. A method according to claim 3 wherein the deflection zone extends over the entire length of the column.

5. In an apparatus for fractional separation of fluid mixtures:

a separatory column;

inlet means to introduce fluid charge to one end thereof;

discharge means to withdraw separated components from the other end thereof;

a mass of separatory material disposed within said column;

deflector means disposed along at least a substantial portion of the length of said column arranged to deflect a stream flowing between said inlet means and said discharge means along deflection paths of substantially constant total cross-sectional area;

said deflector means comprising helically twisted units of a sheet material impervious to said fluid having a width about equal to the diameter of said column and a length at least equal to the width;

each unit of said deflector means having a direction of twist opposite to that of adjacent such units and being so arranged that the ends of adjacent units are disposed at an angle to each other.

6. An apparatus according to claim 5 wherein the mass of separatory material is one of a selective porous solid adsorbent and a liquid separation agent on a carrier.

7. An apparatus according to claim 6 wherein a carrier gas is introduced along with the fluid charge for passage through the column.

8. An apparatus according to claim 7 wherein a plurality of said deflector means are utilized to extend along the entire length of said column.

9. An apparatus according to claim 8 wherein said plurality of deflector means are maintained in stacked end-to-end relationship, the adajcent ends being at right angles to each other.

References Cited

UNITED STATES PATENTS

| | | | |
|---|---|---|---|
| 3,016,107 | 1/1962 | Strange et al. | 55—197 X |
| 3,176,501 | 4/1965 | Briggs | 73—23.1 |
| 3,286,992 | 11/1966 | Armeniades et al. | 138—42 X |
| 3,492,794 | 2/1970 | Reynolds et al. | 55—386 |
| 3,531,919 | 10/1970 | Keulemans | 55—386 |

JAMES L. DECESARE, Primary Examiner

UNITED STATES PATENT OFFICE
CERTIFICATE OF CORRECTION

Patent No. 3,626,666             Dated  December 14, 1971

Inventor(s) B. M. Drinkard

It is certified that error appears in the above-identified patent and that said Letters Patent are hereby corrected as shown below:

Column 5, line 7 - after "September 23, 1968" insert -- and made a part hereof --.

Column 6, line 5 - change "HEPT" to -- HETP --.

Column 6, line 47 - change "5.30" to -- 4.30 --.

Column 6, line 57 - change "Al$_2$O$_3$" to -- W$_2$O --.

Column 6, line 57 - change "SiO$_2$" to -- YO$_2$ --.

Column 7, line 8 - change "H$_3$O" to -- H$_2$O --.

Column 8, line 7 - change "Soxhlet" to -- Soxhelt --.

Column 8, line 5 - change "Gram" to -- Grams --.

Signed and sealed this 21st day of November 1972.

(SEAL)
Attest:

EDWARD M. FLETCHER, JR.                ROBERT GOTTSCHALK
Attesting Officer                       Commissioner of Patents